United States Patent [19]

Akashi

[11] Patent Number: 4,514,115
[45] Date of Patent: Apr. 30, 1985

[54] TAP HOLDER

[75] Inventor: Yukimasa Akashi, Minohshi, Japan

[73] Assignee: Showa Seiki Kabushiki Kaisha, Osaka, Japan

[21] Appl. No.: 413,644

[22] Filed: Sep. 1, 1982

[30] Foreign Application Priority Data

May 19, 1982 [JP] Japan .................................. 57-85362

[51] Int. Cl.³ ............................ B23G 1/46; B23B 3/00
[52] U.S. Cl. ................................. 408/139; 408/141; 408/239 R; 279/16; 10/141 H
[58] Field of Search .............. 408/141, 142, 146, 198, 408/199, 238, 239 R, 714, 139, 129, 186; 10/89 F, 141 H; 279/16

[56] References Cited

U.S. PATENT DOCUMENTS

| 2,626,029 | 1/1953 | Gutterman | 408/139 |
| 2,764,416 | 9/1956 | Martin | 408/139 |
| 3,174,599 | 3/1965 | Spyridakis et al. | |
| 3,214,773 | 11/1965 | Benjamin et al. | 408/714 |
| 3,764,152 | 10/1973 | Eaves et al. | 279/16 |
| 3,787,136 | 1/1974 | Steiner | 408/139 |
| 3,806,973 | 4/1974 | Hopkins | 10/141 H |
| 4,028,763 | 6/1977 | Jenner | 10/141 H |
| 4,080,090 | 3/1978 | Kern | 408/714 |
| 4,364,694 | 12/1982 | Miles | 408/141 |

FOREIGN PATENT DOCUMENTS

| 663102 | 12/1951 | United Kingdom | 10/89 F |
| 315511 | 10/1971 | U.S.S.R. | 408/141 |

Primary Examiner—Gil Weidenfeld
Assistant Examiner—Daniel W. Howell
Attorney, Agent, or Firm—Jordan and Hamburg

[57] ABSTRACT

A tap holder adapted for attachment to the main spindle of machine tool to cut internal threads in a workpiece, the tap holder including a floating mechanism by which the tap holding spindle is smoothly moved in the axial direction, the floating mechanism being featured by a single coil spring compressible in association with the axial movement of the tap holding spindle, and by its feasibility that a possible error occurring between the lead of the tap and the feed of the main spindle of the machine tool is automatically corrected.

7 Claims, 11 Drawing Figures

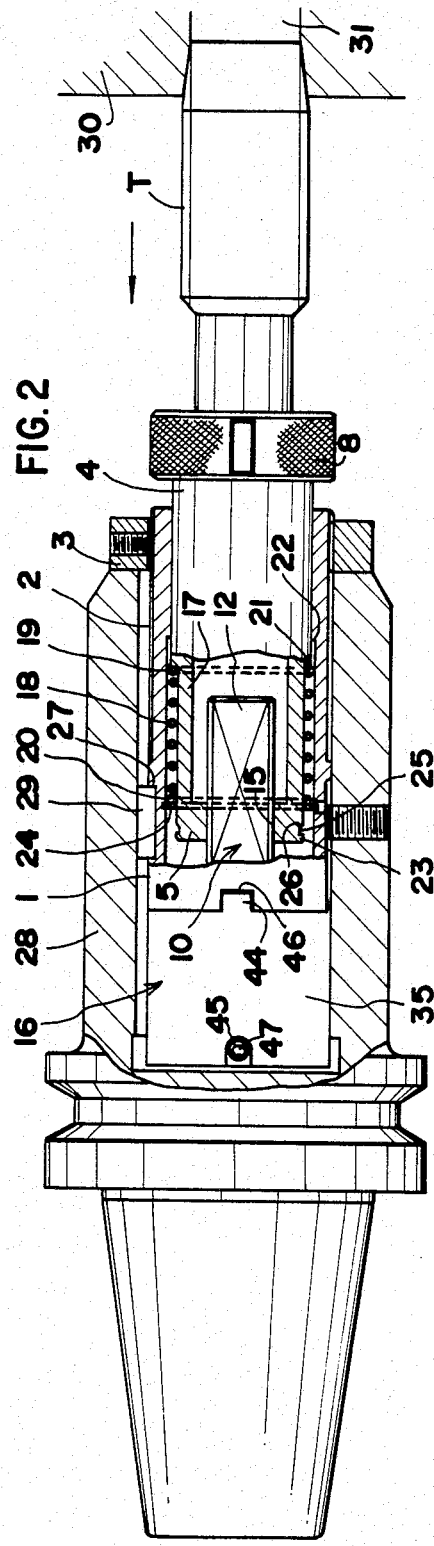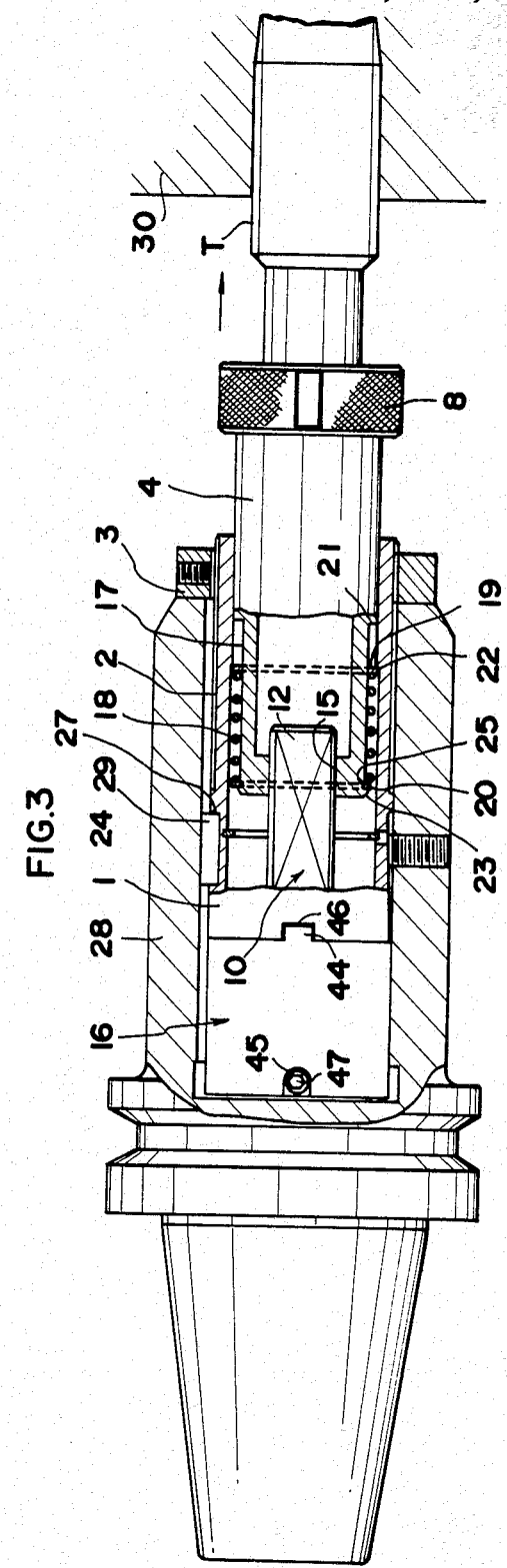

TAP HOLDER

BACKGROUND OF THE INVENTION

The present invention relates to a tap holder adapted for use in association with machine tools of various kinds, and more particularly, to a tap holder including a spring-loaded tap supporter whereby the tap is smoothly and effectively moved to cut internal threads in the workpiece. The tap supporter is spring-loaded such that an error likely to occur between the lead of the tap and the feed of the main spindle of the associated machine tool is automatically corrected.

It is known in the art that a tap holder is provided with a spring-loaded tap supporter whereby the tap is smoothly moved in the axial direction, commonly called "axial floating". The known tap supporter includes two coil springs coaxially overlaid wherein the outer coil spring works on the tap holding spindle when the spindle is advanced toward the workpiece whereas the inner coil spring works on the spindle when it is shrunk or withdrawn from the workpiece. In cutting internal threads the critical moment is when the tap is withdrawn. In order to enable the cutting face of the tap to be caught in the metal surface of the work, the inner coil spring must have a sufficient strength. However, owing to its inner location the diameter is restricted, and to compensate for it a greater number of windings will be needed, which necessarily leads to a prolonged length. As a whole the size and length of the tap holder become large. A large tap holder makes it difficult to be used in a restricted space or when holes are closely made in the workpiece. A more serious disadvantage is that a long tap holder is more liable to oscillation, which adversely affects the precision of the threads being cut.

OBJECTS AND SUMMARY OF THE PRESENT INVENTION

The present invention is directed toward a tap holder having an improved axial floating mechanism, and it is a principal object of the present invention to provide a tap holder having a single compressive coil spring which works on the tap holding spindle both at the moment of its being extended and shrunk, thereby simplifying the structure of the tap holder.

Another object of the present invention is to provide a tap holder having a uniquely constructed torque transmission whereby the torque is imparted by the holder body to the tap holding spindle in an efficient manner, thereby reducing the size of the tap holder without impairing its efectiveness.

A further object of the present invention is to provide a tap holder enabling the tap edges to be securely caught in the metal surface of the work.

Other objects, features and advantages of the present invention will become more apparent from the following description when taken in connection with the accompanying drawings, which show, for the purpose of illustration only, an embodiment of the tap holder.

According to one advantageous aspect of the present invention, there is a tap holder which includes a cylindrical body rotated by the main spindle of an associated machine tool, a tap holding spindle slidably inserted in the cylindrical body, the tap holding spindle being recessed at its top so as to receive a tap, the cylindrical body including a torque transmission means coupled to the tap holding spindle so as to permit relative axial movement thereof, a coil spring provided in a ring-shaped recess produced between the inside wall of the cylindrical body and the outside wall of the tap holding spindle, the ring-shaped recess being defined by a first shoulder and a second shoulder toward the top of the tap holding spindle, the first shoulder being produced in the cylindrical body and the second shoulder being produced in the tap holding spindle, the coil spring being engaged by a first stop ring placed in abutment with the first and second shoulders and a second stop ring placed in abutment with a ring-shaped projection produced adjacent to the end of the tap holding spindle, the cylindrical body having an inner flange anchored in its inside wall for stopping the second stop ring, the inner flange having a central opening through which the tap holding spindle and the torque transmission means are passed, the first and second stop rings being slidable in the ring-shaped recess in association with the axial movement of the tap holding spindle.

According to another advantageous aspect of the present invention the tap holder mentioned above further includes an arrangement in which the tap holding spindle has a ring-shaped groove defined by the ring-shaped projection and a relatively round sloped bank, the groove being for allowing the second stop ring to be engaged therein, the round sloped bank being adapted to facilitate engagement and disengagement of the second stop ring with the groove.

The present invention will be more particularly described by way of example with reference to the accompanying drawings.

BRIEF DESCRIPTION OF THE DRAWINGS

FIGS. 2 and 3 are cross-sectional views showing the interrelated movement of the internal components of the tap holder;

DETAILED DESCRIPTION OF THE INVENTION

Figure 9:
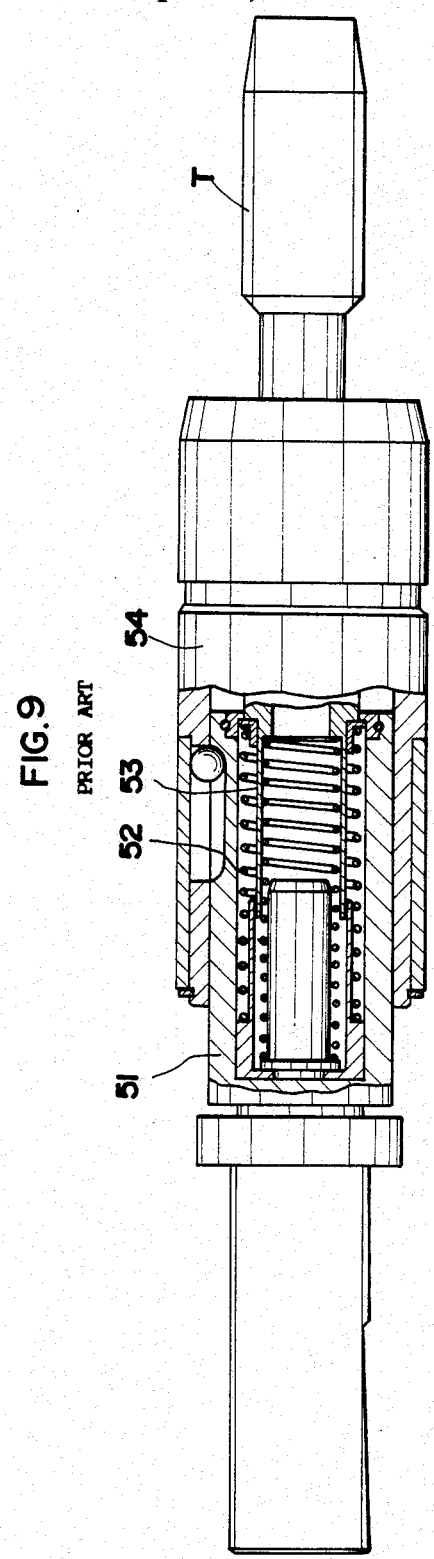
FIG. 9 is a cross-sectional view showing a prior art tap holder.

In order to explain the background of the present invention, reference will be more particularly made to a typical example of a tap holder known in the art, shown in FIG. 9. This represents a prior art tap holder having an axial floating mechanism. The tap holder has a body 51 which includes two coil springs 52 and 53. The spring 52 is adapted to work on a tap holding spindle 54 when the tap (T) is advanced forward or extended outward. The coil spring 53 is adapted to work thereon when the tap (T) is withdrawn or shrunk from the work. To shorten the entire length of the tap holder these two coil springs are coaxially overlaid. It is essential for the coil spring 53 to have a large compressive force sufficient to enable the cutting face of the tap to be securely caught in the work. However, the coil spring 53 is located inside the coil spring 52, whereby its diameter is restricted. To compensate for the restricted diameter the coil spring 53 must have a greater number of windings to strengthen its compressive force. This of course results in a large-sized tap holder. When the length of the tap holder is prolonged, it is more liable to oscillation, which adversely affects the precision of the cutting threads. Another disadvantage is that tap holders having a large diameter become unsuitable for applying in a restricted area or when the holes to be tapped are closely located.

Figure 1:
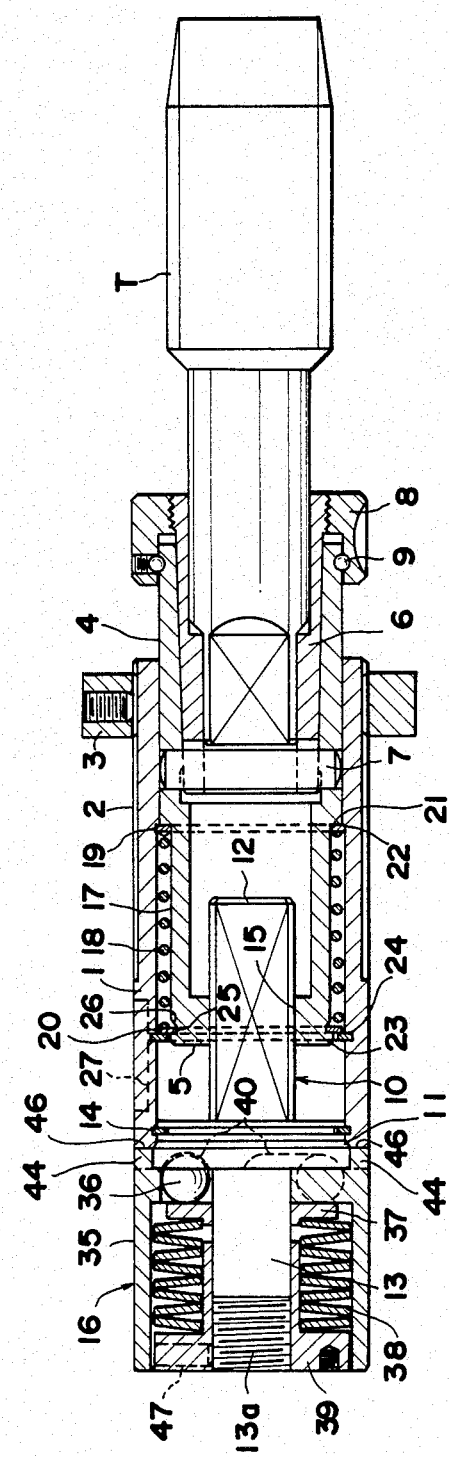
FIG. 1 is a vertical cross-section through a tap holder according to the present invention.

Referring now to FIG. 1 one embodiment of the present invention will be described:

A tap holder has a cylindrical body 1; the reference numeral 2 designates a threaded portion on which a lock nut 3 is screwed. A tap holding spindle 4 is slidably inserted in the cylindrical body. The tap holding spindle 4 is recessed at its top so as to receive a tap (T), and at its rear end it has a bottom wall 5 including a tetragonal opening 15 through which a torque transmission unit 10 is slidably inserted, as will be hereinafter described in greater detail. The reference numeral 6 designates a collet fastened to the tap holding spindle 4 by means of a pin 7. A clamp nut 8 is screwed on the top end of the tap holding spindle 4, wherein balls are interlocated therebetween. As the name implies, the clamp nut 8 is adapted to secure the tap (T) inserted in the collet 6 to the tap holding spindle 4.

The torque transmission unit 10 is intended to transmit torque from the body 1 to the tap holding spindle 4. The torque or rotating drive is imparted to the body 1 from the main spindle of an associated machine tool (not shown). The torque transmission unit 10 has a disc 11 detachably fixed to the rear end of the body 1 by means of a fastening ring 14. The disc 11 has the tetragonal shaft 12 extending toward the tap holding spindle 4. As mentioned above, the tetragonal shaft 12 is inserted through the similarly shaped opening 15 produced in the bottom wall 5 of the tap holding spindle 44 such that their relative axial movement is possible. The cross-sectional shape is not limited to a tetragonal one provided that it is polygonal so as to enable the shaft 12 to be effectively engaged with the tap holding spindle 4 to transmit torque from the body 1 to the tap holding spindle 4. In this case the torque from the body 1 is imparted to the tap holding spindle 4 through a torque limiter 16 secured to a shaft 13 erected on the disc 11 opposedly to the tetragonal shaft 12. The structure and function of the torque limiter 16 will be describe in greater detail below.

Figure 4:
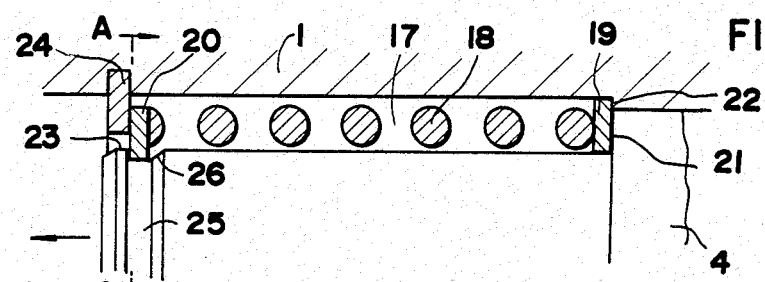
FIG. 4 (1), (2) and (3) are explanatory views showing the axial floating mechanism included in the tap holder, particularly showing a state in which the tap is withdrawn rearward.
Figure 4:
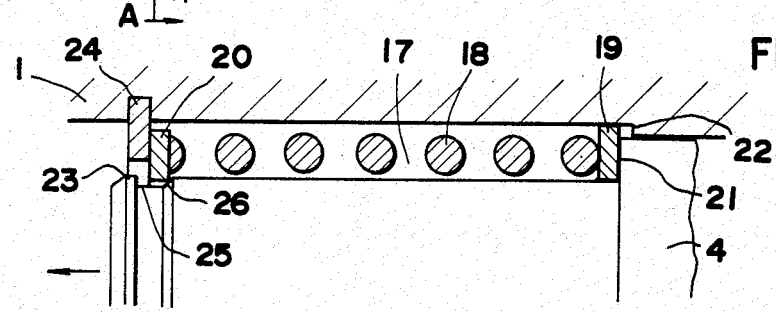
Figure 4:
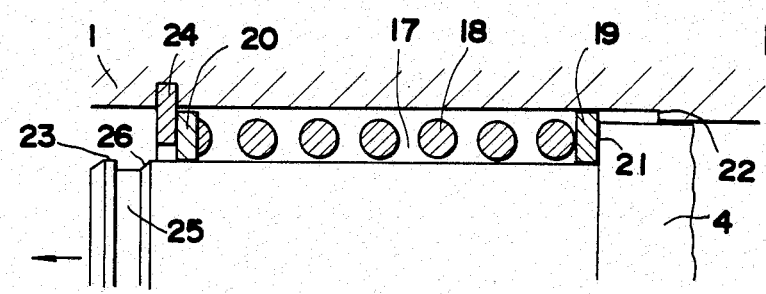

As evident from the drawings, the body 1 and the tap holding spindle 4 are connected to each other in a telescopic manner. However, unlike an ordinary telescopic connection there is provided a recess 17 for accommodating a coil spring 18 between the body 1 and the tap holding spindle 4. More exactly, the recess 17 is formed by two ring-shaped grooves, wherein one is made in the inside surface of the body 1 and the other in the outside surface of the tap holding spindle 4. The recess 17 is defined by shoulders 21 and 22 toward the top end of the tap holding spindle 4. The shoulder 21 is made in the tap holding spindle 4 and the shoulder 22 in the body 22, as best shown in FIGS. 4(1)–4(3). Normally these two shoulders 21 and 22 are aligned on the same vertical plane as shown in FIG. 4 (1). As the tap holding spindle 4 is withdrawn rearward, the shoulder 21 is moved away from the shoulder 22, which will hereinafter be referred.

Figure 5:
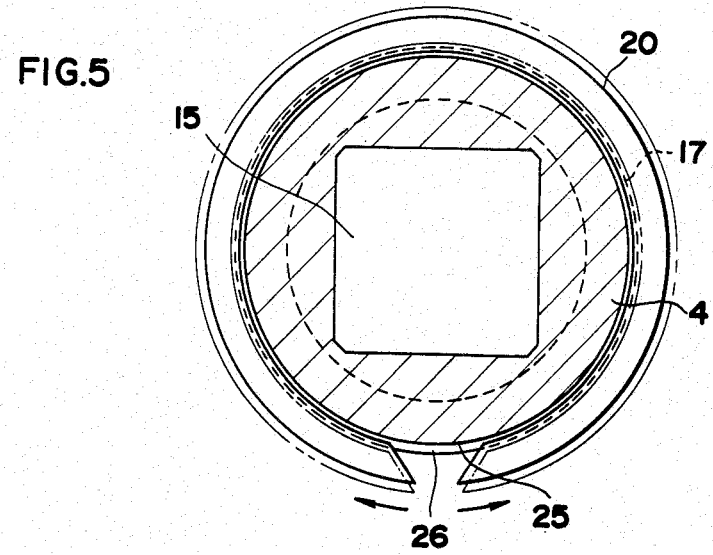
FIG. 5 is a cross-section taken along the line A—A in FIG. 4.

The coil spring 18 is accommodated in the recess 17 between stop rings 19 and 20, wherein the stop ring 19 is placed in abutment with the shoulders 21 and 22 as shown in FIGS. 1 and 4(1), and wherein the stop ring 20 is placed in abutment with a ring-shaped projection 23 produced around the periphery of the end portion of the tap holding spindle 4 as well as a ring-shaped inner flange 24 anchored in the inside wall of the body 1. The inner flange 24 has a central opening for allowing the tap holding spindle 4 to pass through. The two stop rings 19 and 20 are slidably placed in the recess 17. The stop ring 19 can be perfectly circular or semi-circular with a broken part like the letter C, whereas the stop ring 20 must be of the letter C shape as shown in FIG. 5. Elasticity is required for the stop ring 20.

In FIGS. 4(1)–4(4) the reference numeral 25 designates a ring-shaped groove defined by the projection 23 and a relatively round sloped bank 26, which is intended to faciliate the sliding of the stop ring 20 thereon. The stop ring 20 is normally engaged in the groove 25 as shown in FIG. 4(1). As the tap holding spindle 4 is withdrawn rearward, the stop ring 20 becomes disengaged from the groove 25 and slides up the sloped bank 26. Finally the stop ring 20 mounts on the tap holding spindle 4 as shown in FIG. 4(3). As the tap holding spindle 4 is advanced forward, the stop ring 20 is caused to return and slide down the sloped bank 26, finally resting in the groove 25. In FIG. 1 the reference numeral 27 designates a key groove produced in the outside surface of the body 1.

Referring to FIG. 2, the body 1 is keyed to a main holder 28 by means of a key 29, and the main holder 28 is coupled to an associated machine tool (not shown). Alternatively, the body 1 can be directly coupled to the associated machine tool.

The rotation of the main spindle of the machine tool is transmitted to the body 1 through the torque limiter 16, and then to the tap holding spindle 4 through the torque transmission unit 10. As the main spindle of the machine tool advances, the tap holding spindle 4 is equally advanced, thereby enabling the tap (T) to drive into a hole 31 previously produced in a workpiece 30 and cut internal threads therein.

When the cutting face of the tap (T) is caught in the inside surface of the hole 31, the tap (T) (accordingly, the tap holding spindle 4) is caused to return in the direction indicated by the arrow in FIG. 2. However, since the stop ring 20 comes into abutment with the flange 24, the axial movement of the tap holding spindle 4 is momentarily stopped as shown in FIG. 4(1). With the application of a further axially moving tendency the stop ring 20 undergoes elastic deformation as shown in FIG. 5, and slides up the sloped bank 26 as shown in FIG. 4(2). Finally the stop ring 20 is landed on the tap holding spindle 4. In the course of the axial movement of the tap holding spindle 4 the coil spring 18 is compressed by the stop rings 19 and 20, wherein the stop ring 19 is pushed backward by the shoulder 21 of the tap holding spindle 4. At the moment when the stop ring 20 slides up the sloped bank 26, a force exerts on the cutting face of the tap (T) to enable same to cut in the inside surface of the hole 31. In this way the cutting face of the tap is securely caught in the metal surface of the workpiece 30, thereby cutting internal threads therein. Once the stop ring 20 has been landed on the tap holding spindle 4, no resisting force exerts in the axial movement of the tap holding spindle 4, thereby producing a "floating effect". The fully compressed coil spring 18 helps the tap holding spindle 4 to return to its original extended state in an efficient and secure manner.

FIG. 3 shows that the tap holding spindle 4 has been advanced forward or extended so as to remedy an error which has occured between the feed of the tap holding spindle 4 by the main spindle of the machine tool and the lead of the tap (T). At this state the stop ring 19 comes into abutment with the shoulder 22 of the body 1 whereby its movement is prevented, whereas the stop ring 20 is pushed by the ring-shaped projection 23, thereby shortening the distance between the two stop rings 19 and 20. In this way the coil spring 18 is compressed therebetween. The compressed coil spring 18 helps the tap holding spindle 4 to return to its original state. As evident from the foregoing description, the coil spring 18 repeats compression and expansion in association with the axial movement of the tap holding spindle 4, and produces a "floating effect" on the tap holding spindle 4.

Figure 6:
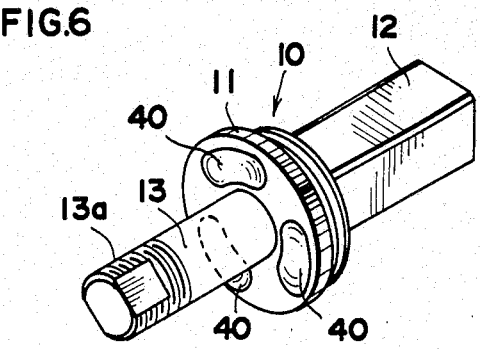
FIG. 6 is a perspective view showing a torque transmission unit.
Figure 7:
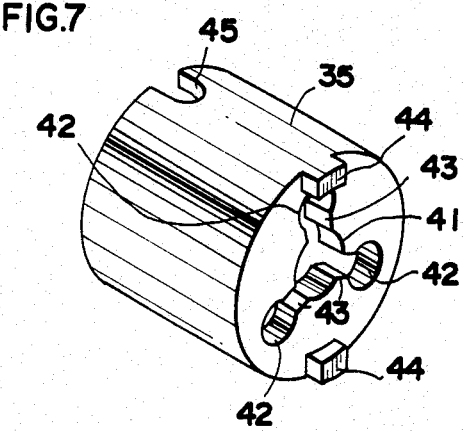
FIG. 7 is a perspective view showing a retainer of the torque limiter.
Figure 8:
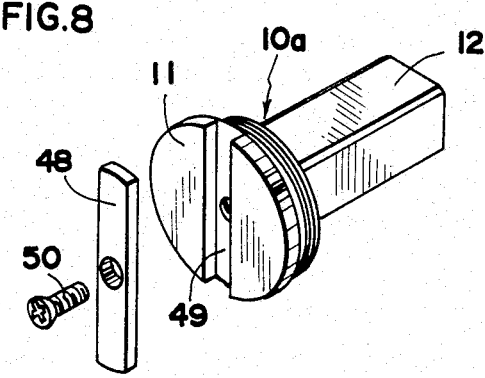
FIG. 8 is a perspective view showing a modified version of the torque transmission unit.

Referring to FIGS. 6, 7 and 8, the structure and function of the torque limiter 16 will be described:

The torque limiter 16 includes a cylindrical retainer 35 with a bottom wall, balls 36 freely received in grooves 40 produced in the rear end surface of the disc 11, a guide bush 37 fitted on the shaft 13, several leaf springs 38 overlaid alternately in opposite directions, and a spring adjuster nut 39. The grooves 40 are produced in the rear end face of the disc 11 at 120° angular displacements as best shown in FIG. 6. The retainer 35 has a bore 41 for allowing the shaft 13 to pass through. Three recesses 42 are provided around the bore 41 at 120° angular displacements, each recess communicating with the bore 41 through a channel 43. The retainer 35 is provided with tenons 44; in the illustrated embodiment, two tenons are provided. The tenons 44 are adapted to be received in corresponding recesses 46 produced in the end portion of the body 1, thereby effecting the union of the body 1 and the retainer 35. In FIG. 7 the reference numeral 45 designates a slot through which a fastening bolt 47 is secured to secure the spring adjuster nut 39. Each ball 36 is accommodated in each recess 42 such that it can effectively roll therein. When the shaft 13 of the torque transmission unit 10 is inserted in the bore 41 of the retainer 35, the balls 36 are received in the grooves 40. The guide bush 37 and the leaf springs 38 are then fitted on the shaft 13. Finally, the spring adjuster nut 39 is screwed in the threaded section 13a of the shaft 13. In this way the torque limiter 16 is assembled. When the compression of the springs 38 is adequately adjusted, the nut 39 is locked by the bolt 47.

The torque limiter 16 is intended to avoid a possible accident in which the tap (T) is likely to be broken or damaged due to overloading. A possible overloading is relieved by disengaging the balls 36 from the grooves 40 against the springs 38. By the disengagement the torque transmission is instantly suspended.

As an alternative embodiment the torque limiter 16 can be dispensed with. In this case, a torque transmission unit 10a having no shaft 13 is employed as shown in FIG. 8, wherein the disc 11 has a slot 49 for receiving a key 48 therein. The key 48 is fastened to the disc 11 by means of a screw 50. The key 48 is long enough to have protruded end portions beyond the slot 49. The protruded end portions of the key 48 are received in the recesses 46 of the body 1. In this way the torque transmission unit 10a is coupled to the body 1 in an equally effective manner as when the fastening ring 14 is used.

In the afore-mentioned embodiments the torque transmission unit 10 and 10a are detachably coupled to the holder body 1 by means of the fastening ring 14, but the torque transmission unit 10, 10a can be permanently coupled to the holder body 1 as an integer.

What is claimed is:

1. A tap holder adapted to be attached to a spindle of a machine, comprising
  a cylindrical body to be rotated by said spindle, said cylindrical body having first and second means for defining a first space at the inner periphery thereof, said first and second means being axially spaced from each other to define the axial ends of the first space,
  a tap holding spindle slidably situated in said cylindrical body, said tap holding spindle having means to receive a tap at a forward end thereof, and third and fourth means for defining a second space at the outer periphery thereof, said third and fourth means being axially spaced from each other to define the axial ends of the second space, the axial length of the second space being equal to the axial length of the first space,
  means for transmitting torque from said cylindrical body to said tap holding spindle, said torque transmitting means being coupled to the tap holding spindle so that the tap holding spindle can be axially moved relative to the cylindrical body,
  a floating mechanism situated in the first and second spaces of the cylindrical body and the tap holding spindle, said floating mechanism having a first stop ring to abut against the first means of the cylindrical body and the third means of the tap holding spindle, a second stop ring to abut against the second means of the cylindrical body and the fourth means of the tap holding spindle, the diameter of the second stop ring being radially changeable upon exertion of radial force thereon, and a spring situated between the first and second stop rings, and
  means for imparting restricted movement to the second stop ring, said means for imparting restricted movement being formed on one of the inner surface of the cylindrical body and the outer surface of the tap holding spindle so that when the tap holding spindle is urged in the axial direction relative to the cylindrical body, the second stop ring initially engages with and finally passes through the means for imparting restricted movement by changing the diameter of the second stop ring, said second stop ring being smoothly moved after passing the means for imparting restricted movement, whereby when the tap holder is actuated initially, the tap holding spindle can be relatively strongly pushed against a workpiece to allow the tap to bite the workpiece but the tap holding spindle can thereafter be held almost floatingly relative to the cylindrical body.

2. A tap holder according to claim 1, in which said means for imparting restricted movement is a sloped bank around the tap holding spindle formed adjacent to the end opposite to the tap receiving means.

3. A tap holder according to claim 2, in which said tap holding spindle further includes a ring-shaped groove and a ring-shaped projection, said sloped bank forming one side of the groove and the projection forming the other side of the groove, the projection also forming the fourth means of the tap holding spindle.

4. A tap holder according to claim 3, in which said first and second means of the cylindrical body are respectively a shoulder formed at the inner periphery of the cylindrical body and a ring-shaped inner flange attached to the inner periphery of the cylindrical body, and said third means of the tap holding spindle is a shoulder formed at the outer periphery of the tap holding spindle.

5. A tap holder according to claim 4, in which said second stop ring is in the form of the letter C, thus being substantially located in the ring-shaped groove, said second stop ring, when pushed in the axial direction of the tap holding spindle, extending outwardly to slide up along the sloped bank and smoothly moving along the outer periphery of the tap holding spindle.

6. A tap holder according to claim 1, in which said means for transmitting torque comprises a torque transmission unit for connecting the tap holding spindle to the cylindrical body so that when the spindle of the machine rotates, the cylindrical body and the tap holding spindle rotate together.

7. A tap holder according to claim 1, in which said means for transmitting torque comprises a torque transmission unit and a torque limiter so that when excess load is applied to the tap holding spindle, rotational force transmitted from the cylindrical body through the means for transmitting torque is interrupted by the torque limiter.

* * * * *